Oct. 13, 1970 J. MATARESE 3,534,403

ERROR DETECTOR TO DISTINGUISH FALSE ERROR SIGNALS FROM A TRUE ERROR CONDITION

Filed Aug. 14, 1967 2 Sheets-Sheet 1

INVENTOR.
JOHN MATARESE

BY Joseph H. Roediger
ATTORNEY.

INVENTOR.
JOHN MATARESE
BY Joseph H. Roediger
ATTORNEY.

United States Patent Office 3,534,403

Patented Oct. 13, 1970

3,534,403

ERROR DETECTOR TO DISTINGUISH FALSE ERROR SIGNALS FROM A TRUE ERROR CONDITION

John Matarese, New City, N.Y., assignor to General Telephone & Electronics Laboratories Incorporated, a corporation of Delaware Filed Aug. 14, 1967, Ser. No. 660,296
Int. Cl. H03k *5/18, 21/34*
U.S. Cl. 235—153 6 Claims

ABSTRACT OF THE DISCLOSURE

A digital error detector for distinguishing occasional false error signals from the existence of a "true" error condition wherein a reversible counter is supplied with error signals and error complement signals. The counter sets a storage element when it is full and is inhibited from receiving additional error signals until the counter is at least partially emptied by error complement signals. When the counter is emptied, the storage element is reset and the counter is inhibited from receiving additional error complement signals.

BACKGROUND OF THE INVENTION

This invention relates to a digital error detector and, in particular, to a digital error detector which distinguishes occasional false error signals from the existence of a "true" error condition.

In the monitoring of an electrical system, the detection of the existence of a "true" error condition requires that the monitoring apparatus discriminate between "true" error signals and noise signals. Typically, noise immunity is obtained by utilizing a type of integrate and trigger detector.

The integrate and trigger detector comprises an intergrating pulse detector network and an analogue to digital level detecting trigger circuit, such as a Schmitt trigger. The error pulses and, in addition, any noise pulses are supplied to the integrator which converts them into an analogue signal. The output of the integrator increases at a rate determined by specified circuit time constants, notably the resistance-capacitance (RC) product. A "true" error condition is recognized when the integrated signal has a magnitude sufficient to place the Schmitt trigger circuit in its "on" or high output state. Noise immunity is provided by making the RC time constant sufficiently long so that the Schmitt trigger circuit is driven "on" only when a number of pulses have been applied to the integrating network.

When an error condition no longer exists, the error pulses are no longer supplied to the integrating network and the output signal thereof decreases at a rate determined by the circuit time constants. The discharge time constant is made sufficiently long so that immunity from false out-of-error signals is obtained. When the output signal of the integrator equals the lower trigger voltage of the Schmitt trigger circuit, the circuit reverts to its "off" state indicating that no error condition exists.

The operation and noise immunity of the integrate and trigger detector primarily rely on the RC circuit time constants. Since these time constants are required to be relatively long as compared to the repetition rate of the error pulses, the integrator requires the use of relatively large resistors and capacitors. While this has not presented a serious problem for detectors fabricated with discrete components, the inability of present integrated circuit techniques to form large capacitors has prevented this type of detector from being fabricated in integrated form. As a result, a need has arisen for a digital error detector which does not require a digital to analogue conversion and, thus, does not rely on circuit time constants for its operation.

SUMMARY OF THE INVENTION

In accordance with the present invention, a digital error detector is provided which comprises a counter, a storage element, and first and second inhibit circuits. The present detector does not require a digital to analogue conversion and, as a result, the detector is not dependent on circuit time constants for operation and noise immunity.

The counter contains first and second input terminals and first and second output terminals. In operation, the counter is reversible in that it changes from one to a higher of a sequence of states in response to a signal appearing at its first input terminal and changes from one to a lower state in response to a signal at its second input terminal. A signal is provided at the first output terminal of the counter when it is in its highest state of the sequence of states. Also, a signal appears at the second output terminal when the counter is in its lowest state.

The first and second output terminals of the counter are coupled to a storage element having first and second states. The output signal from the first output terminal sets this storage element in its first state and the signal at the second terminal resets it to its second state. As a result, the state of the storage element is indicative of the presence of a true error condition.

However to prevent the alteration of the sequence of states by the receipt of signals which tend to increase the count when the counter is full or decrease the count when the counter is empty, the first and second input terminals of the counter are each coupled to the output terminal of a corresponding inhibit circuit. The inhibit circuits each have first and second input terminals and are characterized by the fact that a signal appearing at the second input terminal is inhibited from appearing at the output terminal thereof when a signal is present at the first input terminal.

The first input terminal of the first inhibit circuit is coupled to the first output terminal of the counter. In addition, the second input terminal thereof is coupled to an error signal source. Thus, when the counter is full the output signal from the counter not only sets the storage element but also inhibits the application of additional error signals to the counter. Also, the first input terminal of the second inhibit circuit is coupled to the second output terminal of the counter. The second input terminal of this inhibit circuit is coupled to an error complement signal source so that the complement signals are not applied to the counter when it is in its empty condition.

The capacity of the counter, i.e. the number of states in the sequence, determines the noise immunity of the detector since a "true" error condition corresponds to a full count and the appearance of a signal at the first counter output terminal which sets the storage element. This "true" error condition continues to be indicated by the storage element until the counter returns to its empty condition. Thus, it will be noted that a sampling of the condition being monitored at a specified pulse repetition rate and the generation of error and error complement signals at this rate provides noise immunity to occasional false error indications by responding only to a specified number of errors in a specified time interval. The particular time interval is determined by the number of states in the sequence of the reversible counter.

In summary, the counter progresses towards the full condition at the rate of one count per error signal for an error condition and reduces its count at the error rate for an out-of-error condition due to the application of the error complement signals. Counting in a given direction stops when the full or empty condition is reached and the storage element is either set or reset. The detector requires no digital to analogue conversion and does not rely on large time constants. Consequently, the detector may be constructed in integrated circuit form by present fabrication methods.

Further features and advantages of the invention will become more readily apparent from the following detailed description taken in conjunction with the accompanying drawings.

DESCRIPTION OF THE PREFERRED EMBODIMENT

Figure 1:
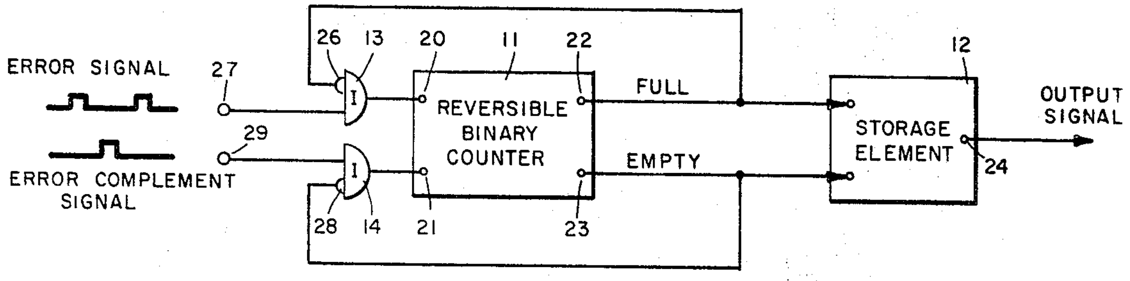
FIG. 1 is a block diagram of one embodiment of the invention.

Referring now to FIG. 1, a digital error detector constructed in accordance with the invention is shown comprising reversible binary counter 11, storage element 12 and first and second inhibit circuits 13 and 14. The reversible binary counter 11 includes first and second input terminals 20, 21 and first and second output terminals 22, 23. This counter is characterized by the fact that it changes from one to a higher of a sequence of states in response to an error signal appearing at terminal 20 and changes from one to a lower of the sequence in response to an error complement signal appearing at terminal 21. Further description of reversible binary counters is found in "Pulse and Digital Circuits" by J. Millman and H. Taub, McGraw-Hill, 1956, at p. 535.

The count in counter 11 is advanced by the application of pulses to input terminal 20. The number of binary stages in the counter determines its capacity, i.e. full and empty limits. Normally when a counter of this type is full and an additional pulse is to be added, the sequence in the counter is destroyed by this additional pulse. However in the present invention, the full or empty condition is stored in storage element 12 and the application of additional pulses which would exceed the counter capacity is prevented.

When the counter is full, a signal appears at first output terminal 22. Also, when the counter is empty a signal appears at second output terminal 23. The first and second output terminals are coupled to storage element 12, for example a bistable multivibrator, which has first and second stable states. The signal from terminal 22 corresponding to a full condition sets element 12 into its first state where it remains until a signal from terminal 23 resets the element into its second stable state. Thus, the signal at output terminal 24 of storage element 12 changes magnitude only when counter 11 goes from a full condition to an empty condition and vice versa.

In addition, the first and second output terminals 22, 23 of the counter are coupled to inhibit circuits 13, 14 respectively. An inhibit circuit is an anticoincidence circuit having the characteristic that an output pulse will appear only if an inhibiting pulse is not present at the inhibiting terminal when a pulse is present at all other input terminals. A detailed analysis of inhibit circuits is contained in "Pulse and Digital Circuits" by J. Millman and H. Taub, McGraw-Hill, 1956, beginning at p. 401.

Inhibit circuits 13 and 14 each contain first and second input terminals with the first input terminal designating the inhibiting terminal. The first input terminal 26 of inhibit circuit 13 is coupled to the first output terminal 22 of counter 11. The second input terminal of inhibit circuit 13 is coupled to an error signal source. Therefore, counter 11 is permitted to receive error signals until it is in its filled condition whereupon the signal at output terminal 22 inhibits the application of further error signals to the counter. Second inhibit circuit 14 has its first or inhibiting terminal 28 coupled to the second output terminal 23 of the counter. The second input terminal 29 of circuit 14 is coupled to an error complement signal source. The error complement signals are passed by inhibit circuit 14 except when counter 11 is empty and a signal appears at its output terminal 23.

Figure 2A:
FIGS. 2*a*–2*d* are representative waveforms occurring at different points in the embodiment of FIG. 1.
Figure 2B:
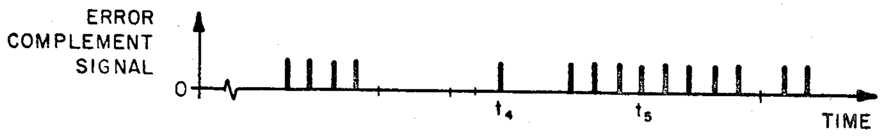

The operation of the present digital detector is explained in conjunction with the waveforms of FIGS. 2*a*–2*d*. FIGS 2*a* and 2*b* show the signals appearing at terminals 27 and 29 of inhibit circuits 13 and 14 respectively. The error signal is either indicative of the existence of "true" error condition in the system or circuit being monitored or may be the result of noise. When no error signal is present, an error complement signal is generated. This is normally provided by utilizing the error signal to inhibit a coincident clock pulse. In the absence of the error signal, the clock pulse is utilized as the error complement signal. However, many different procedures may be used to generate these signals.

The waveforms of FIGS. 2*a*–2*d* illustrate a count-of-four detector in which a net total of four error signals in a given time interval is required to indicate the presence of a "true" error condition. Initially, the counter 11 is empty and the error complement signals appearing at terminal 29 of inhibit circuit 14 are inhibited from being applied to input terminal 21 of counter 11. As noted in FIG. 2*c*, the recorded count in counter 11 remains at zero. The output signal at terminal 24 of storage element 12 is at zero which corresponds to its reset condition.

Figure 2C:
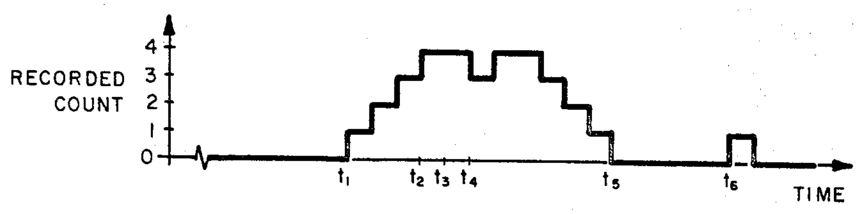
Figure 2D:
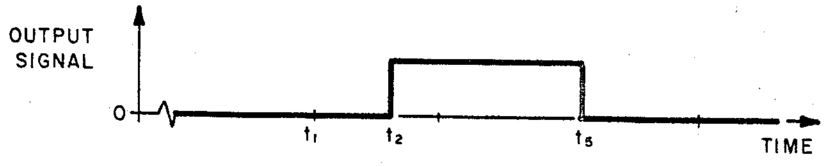

At time $t_1$, an error signal is applied to terminal 27 of inhibit circuit 13. The signal is not inhibited since the counter is not in its full condition. Thus, the recorded count of the counter is advanced to 1. As a result, the counter is no longer empty and no signal is present at terminal 28 of inhibit circuit 14. The counter may advance or retard with the next signal. However, the following three error signals fill the counter so that at time $t_2$ the recorded count is four and the signal from terminal 22 of counter 11 sets storage element 12. Consequently, the voltage at terminal 24 of element 12 increases as shown in FIG. 2*d*.

In addition, the signal at terminal 22 is applied at terminal 26 of inhibit circuit 13 whereby additional error signals are prevented from appearing at input terminal 20 of counter 11. Thus, the next succeeding error pulse at time $t_3$ does not alter the recorded count as shown in FIG. 2*c*. At time $t_4$, an error complement signal is applied to the counter and retards the count by one. However, the output signal at terminal 24 is not altered. It will be noted that the output signal at terminal 24 is not altered. It will be noted that the output signal shown in FIG. 2*d* continues to indicate an error condition until time $t_5$ when the counter is empty due to the receipt of four error complement signals.

At time $t_5$, the counter 11 is empty and a signal appears at terminal 23 of the counter. This signal resets storage element 12 and the output signal is essentially zero. This is indicative of an out-of-error condition and the signal is immune to occasional false error signals such as that occurring at time $t_6$. Thus, the present detector provides noise immunity to both false error and false out-of-error signals by responding only to a specified net total of similar signals as determined by the count of the reversible counter.

Figure 3:
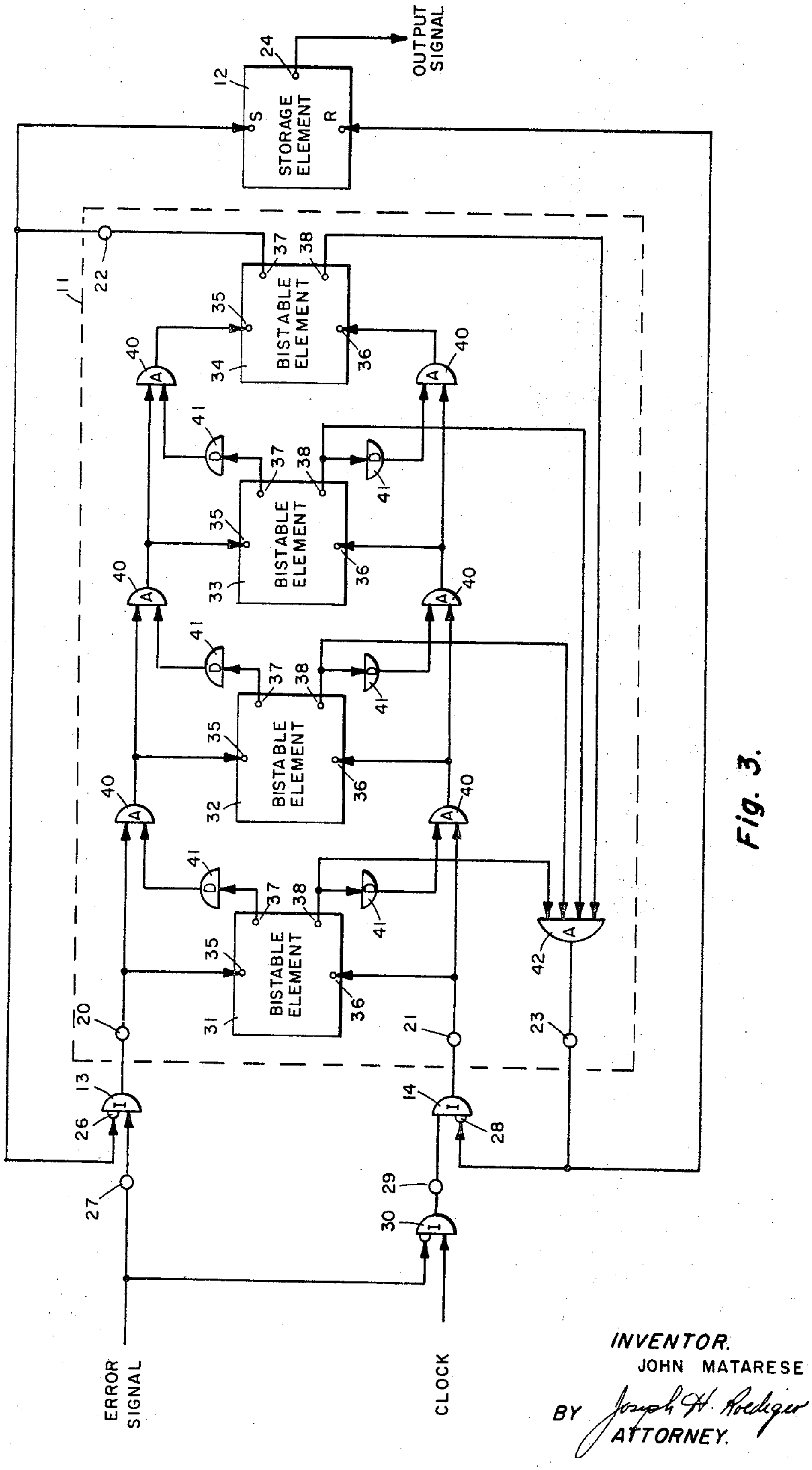
FIG. 3 is a detailed block schematic diagram of an embodiment of the invention.

A more detailed block diagram of the invention is shown in FIG. 3 including also an inhibit circuit 30 coupled to the error signal source and to a clock signal source. This is a relatively simplified method of generating the error complement signals. The counter 11, having a capacity of eight, is shown comprising a plurality of bistable elements 31, 32, 33 and 34.

The bistable elements, normally multivibrators, each contain first and second input terminals 35, 36 and first and second output terminals 37, 38. The application of a signal to terminal 35 of a particular multivibrator switches the output voltage at the corresponding terminal 37 between 1 and 0 states. The next succeeding bistable element is switched when the preceding one is in its 1 state so that the input signal is passed by the corresponding "and" circuit 40. The terminals 36 and 38 are interconnected in a similar manner. The individual connections between bistable elements each contain a delay element 41 to insure that the passage of signals to the next succeeding bistable element is not blocked by the transition of the preceding element. In practice, the counter may utilize the inherent delay of a transistor rather than individual delay elements.

When the counter is full, i.e. has received a net total of eight error signals, terminal 37 of element 34 is at the 1 or high voltage level. As a result, storage element 12 is set and further error signals are inhibited by circuit 13. It shall be noted that the terminals 37 of the remaining elements are in the 0 or low voltage level at this time. The receipt of error complement signals causes the counter to shift to lower states in its sequence. When the counter is empty, i.e. at its lowest state all of the terminals 38 are at the 1 or high voltage level and the voltage level passed by "and" circuit 42 inhibits further error complement signals from being applied to the counter. In addition, this voltage level resets storage element 12 so that the output signal is essentially zero.

Thus, the present digital error utilizes a reversible dual input binary counter having full and empty limits and a storage element. The full and empty limits are maintained by the use of inhibit circuits coupled to the counter output. Since the detector is digital and does not require long time constants, it may be fabricated in integrated circuit form by conventional techniques.

While the foregoing description has been with reference to the signals being processed by the single-ended block diagrams of FIGS, 1 and 3, it is understood that the signals referred to in the description are generally voltage levels determined with respect to a reference potential, i.e. ground.

What is claimed is:

1. A digital error detector responsive to error signals and error complement signals which comprises:

(a) a counter having first and second input terminals and fist and second output terminals, said counter changing from one to a higher of a sequence of states in response to a signal appearing at said first input terminal, said counter changing from one to a lower of said sequence of states in response to a signal appearing at said second input terminal, said counter providing a signal at said first output terminal when in its highest state and providing a signal at said second output terminal when in its lowest state;

(b) a storage element coupled to the output terminals of said counter, said element having first and second states, said element being triggered into its first state by a signal of said first output terminal and being triggered into its second state by a signal of said second output terminal, the first state of said element being indicative of an error condition;

(c) a first inhibit circuit having first and second input terminals and an output terminal, said output terminal being coupled to the first input terminal of said counter, the first input terminal of said inhibit circuit being coupled to an error signal source, the second input terminal of said inhibit circuit being coupled to the first output terminal of said counter whereby an error signal is inhibited from appearing of said first counter output terminal when said counter is in the highest state of the sequence; and (d) a second inhibit circuit having first and second input terminals and an output terminal, said output terminal being coupled to the second input terminal of said counter, the first input terminal of said inhibit circuit being coupled to an error complement signal source, the second input terminal of said inhibit circuit being coupled to the second output terminal of said counter whereby an error complement signal is inhibited from appearing at said second counter input terminal when said counter is in the lowest state of the sequence.

2. Apparatus in accordance with claim 1 in which said counter comprises (a) a plurality of bistable elements, each of said elements having first and second input terminals and first and second output terminals, said first input terminals being coupled to the first input terminal of said counter, said second input terminals being coupled to the second input terminal of said counter, the first and second output terminals of each element being coupled to the corresponding input terminal of the next succeeding element, the first output terminal of the last element being coupled to the first output terminal of the counter and (b) means for coupling the second output terminals of said elements to the second output terminal of said counter.

3. Apparatus in accordance with claim 2 in which said means for coupling is an "and" circuit.

4. Apparatus in accordance with claim 3 further comprising (a) a first plurality of "and" circuits each having first and second input terminals and an output terminal, said first and second input terminals being coupled to the first input and first output terminals respectively of one of said elements, said output terminal being coupled to the first input terminal of the next succeeding element, and (b) a second plurality of "and" circuits each having first and second input terminals and an output terminal, said first and second input terminals being coupled to the second input and second output terminals respectively of one of said elements, said output terminal being coupled to the second input terminal of the next succeeding element.

5. Apparatus in accordance with claim 4 further comprising a plurality of delay elements, each of said elements being coupled to an output terminal of one of said plurality of bistable elements and to the corresponding "and" circuit.

6. Apparatus in accordance with claim 4 for generating an error complement signal comprising (a) a third inhibit circuit having first and second input terminals and an output terminal, said second input terminal being coupled to a clock signal source, said first input terminal being coupled to the first input terminal of said first inhibit circuit whereby an error signal appearing at the first input terminal of said first inhibit circuit inhibits the clock, or error complement signal, from appearing at the output terminal of said second inhibit circuit.

References Cited

UNITED STATES PATENTS

| | | | |
|---|---|---|---|
| 3,206,665 | 9/1965 | Burlingham | 328—44 X |
| 3,263,097 | 6/1966 | Noble | 307—222 |

EUGENE G. BOTZ, Primary Examiner

R. S. DILDINE, Jr., Assistant Examiner

U.S. Cl. X.R.

307—222; 328—44; 340—146.1